United States Patent
Tanaka

(10) Patent No.: US 8,928,940 B2
(45) Date of Patent: Jan. 6, 2015

(54) IMAGE FORMING APPARATUS, IMAGE FORMING METHOD, AND INTEGRATED CIRCUIT

(71) Applicant: Shinya Tanaka, Kanagawa (JP)

(72) Inventor: Shinya Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 59 days.

(21) Appl. No.: 13/739,257

(22) Filed: Jan. 11, 2013

(65) Prior Publication Data

US 2013/0182269 A1 Jul. 18, 2013

(30) Foreign Application Priority Data

Jan. 13, 2012 (JP) ................. 2012-005548

(51) Int. Cl.
*H04N 1/60* (2006.01)
*H04N 1/46* (2006.01)
*H04N 1/387* (2006.01)

(52) U.S. Cl.
CPC ............... *H04N 1/60* (2013.01); *H04N 1/3871* (2013.01); *H04N 1/6027* (2013.01)
USPC ............................. 358/1.9; 358/536; 358/538

(58) Field of Classification Search
USPC ......... 358/1.9, 520, 521, 523, 1.18, 501, 530, 358/3.17, 536, 538; 399/394; 347/139; 345/596; 382/173, 174
See application file for complete search history.

(56) References Cited

U.S. PATENT DOCUMENTS 6,587,115 B2 * 7/2003 Gong et al. ................... 345/596

FOREIGN PATENT DOCUMENTS

| JP | 09-200551 | 7/1997 |
| JP | 2007-030456 | 2/2007 |
| JP | 2011-139292 | 7/2011 |

* cited by examiner

*Primary Examiner* — Charlotte M Baker
(74) *Attorney, Agent, or Firm* — Harness, Dickey & Pierce P.L.C.

(57) ABSTRACT

An image forming apparatus includes a density conversion unit converting the density of one or more image data from among plural image data to be combined having different tones so as to correspond to the tone to be combined; a combine unit combining the plural image data by using the image data whose density is converted by the density conversion unit; and an image forming unit forming an image by using the image data combined by the combine unit.

9 Claims, 7 Drawing Sheets

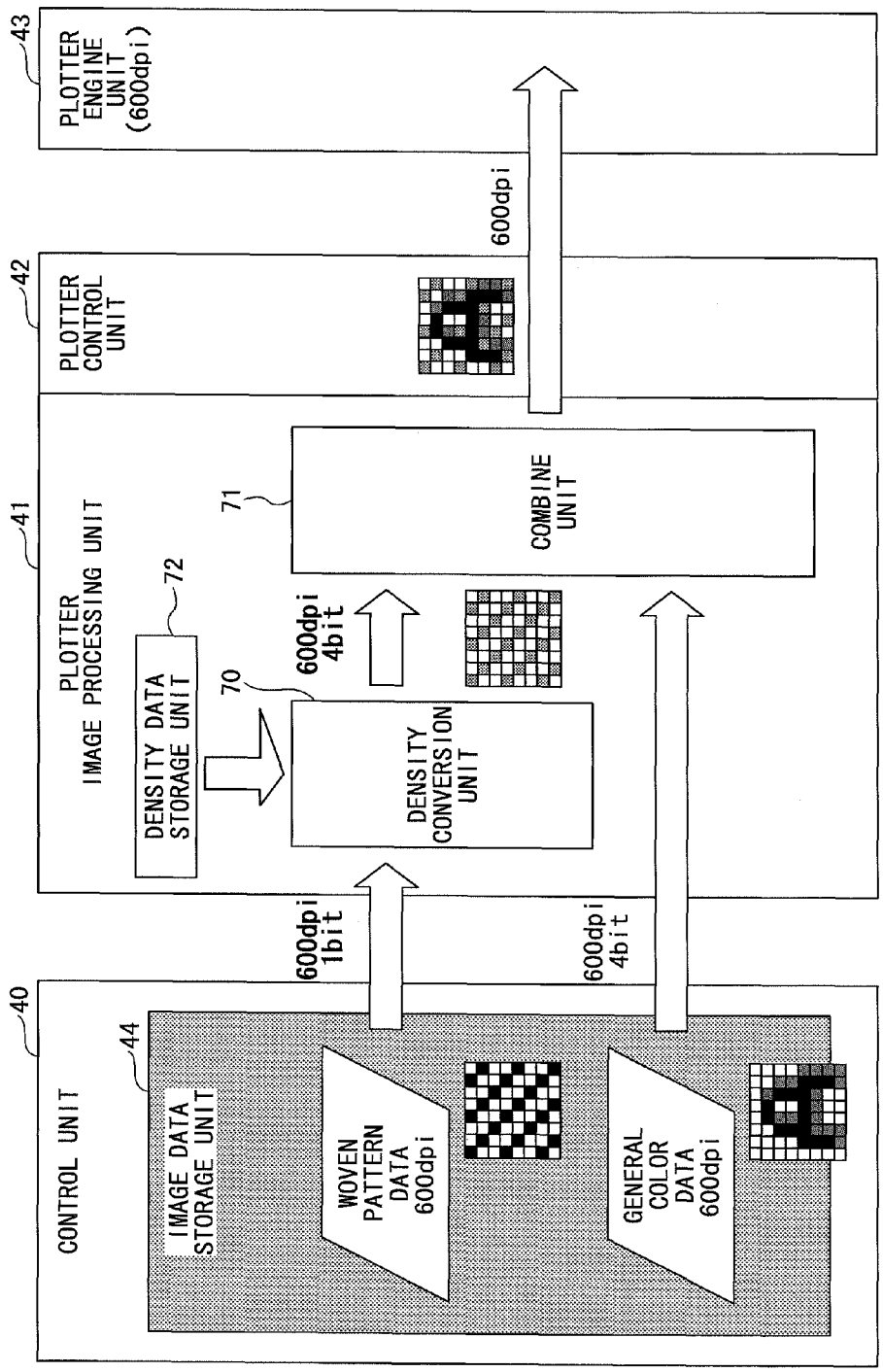

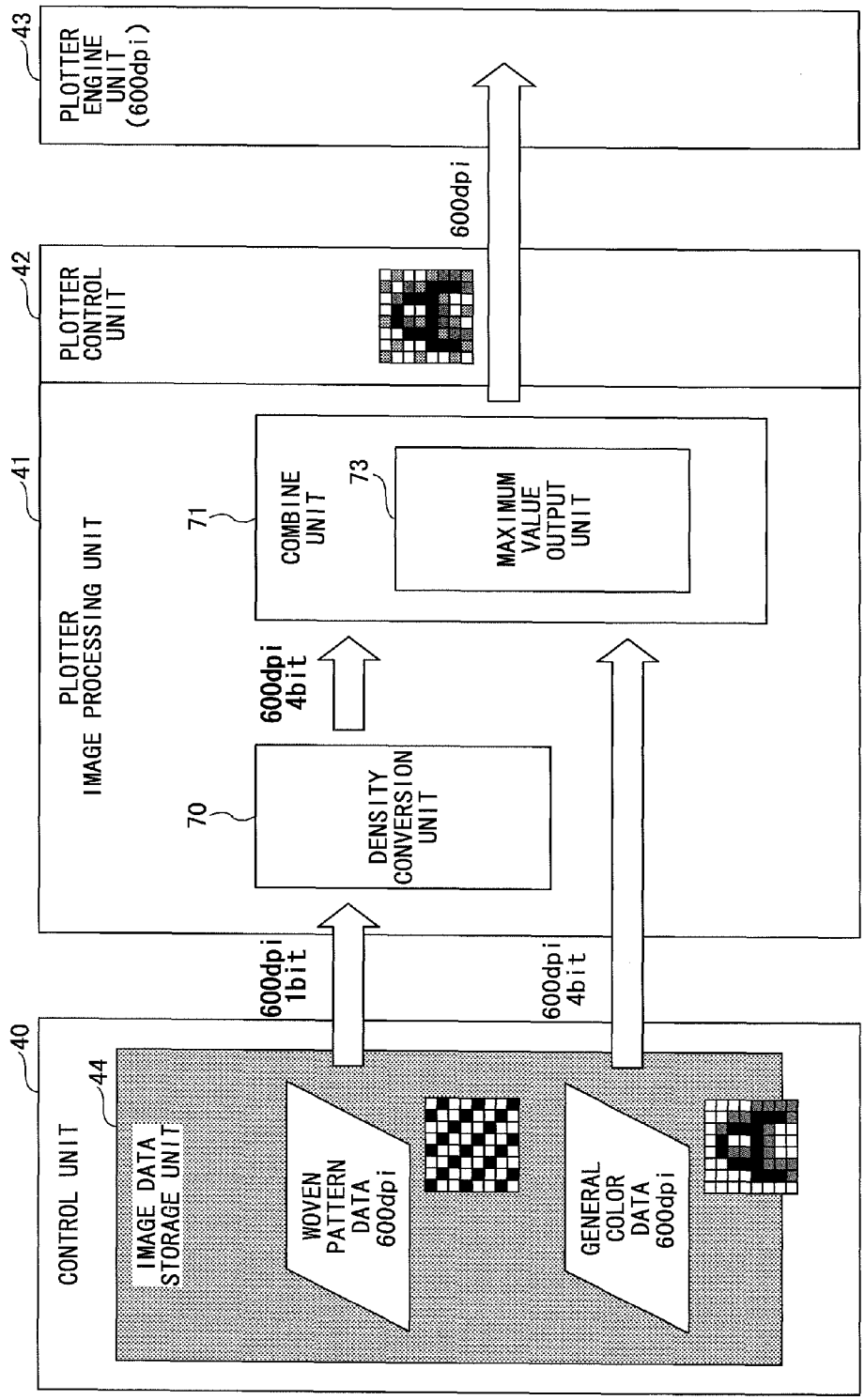

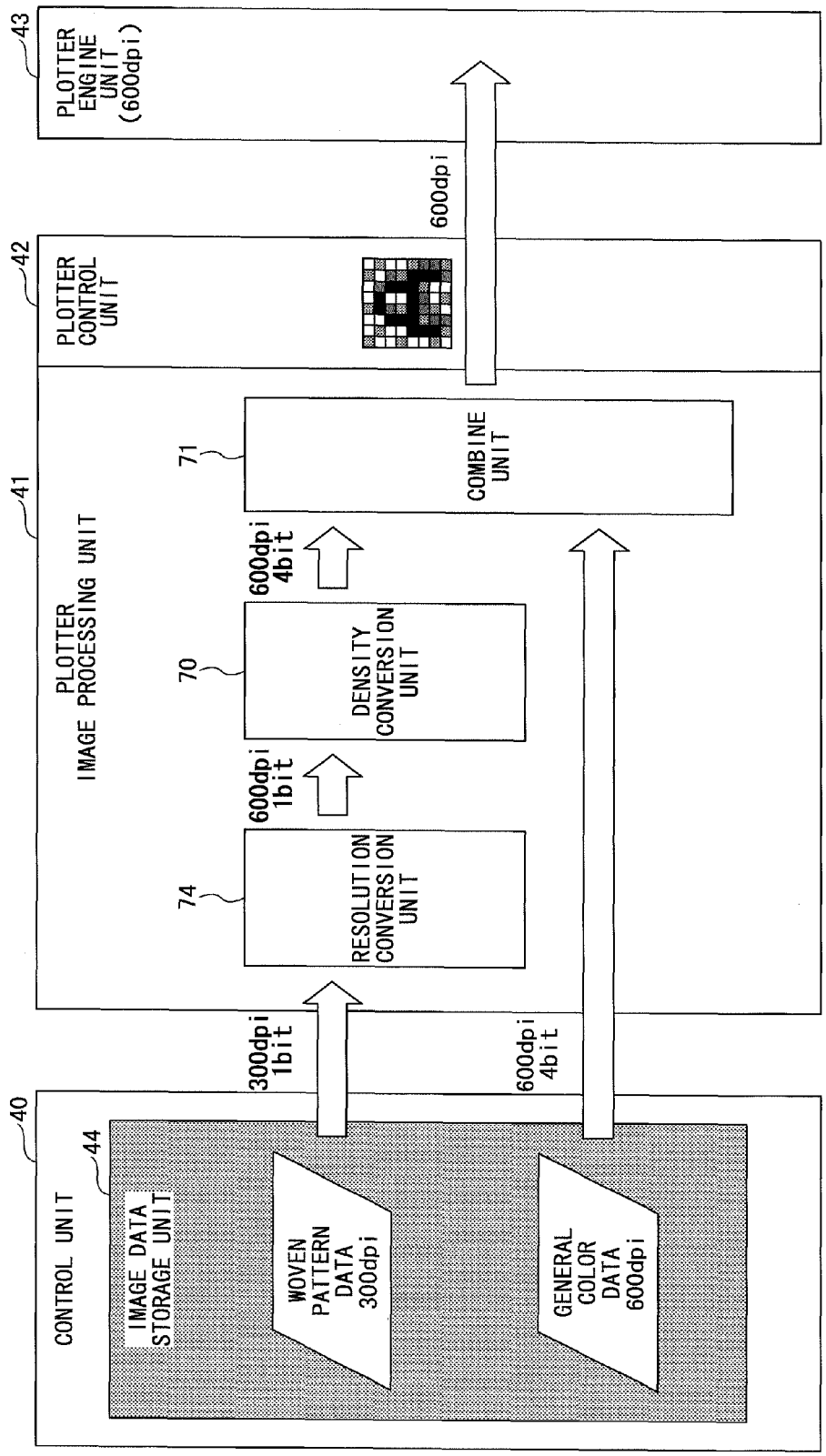

IMAGE FORMING APPARATUS, IMAGE FORMING METHOD, AND INTEGRATED CIRCUIT

CROSS-REFERENCE TO RELATED APPLICATIONS

The present application claims priority under 35 U.S.C §119 to Japanese Patent Application No. 2012-005548 filed Jan. 13, 2012, the entire contents of which are hereby incorporated herein by reference.

BACKGROUND OF THE INVENTION

1. Field of the Invention

The present invention generally relates to an image forming apparatus, an image forming method, and an integrated circuit.

2. Description of the Related Art

There has been a known an image forming apparatus that includes, for example, not only toner cartridges for general colors such cyan (C), magenta (M), yellow (Y), and black (K) colors but also a toner cartridge exclusively used for forming a background image in a woven pattern and a cartridge for transparent color toner to be applied for glossy finish.

Here, a fine gradation expression in video data forming a woven pattern image or the like may be less necessary than in video data forming a general color image. Therefore, the gradation in video data for a woven pattern image may be provided in a manner that the gradation in the video data for the woven pattern image is different from that in video data for general color images. Some of the reasons of this are to save memory capacity and improve performance of data transfer in a controller.

In such a case, to prevent the quality degradation of an output image, there is a known technique in which a woven pattern image of binary image data and an original picture image of multi-valued image data are combined by controlling a total toner amount (see, for example, Japanese Laid-open Patent Publication No. 2011-139292).

SUMMARY OF THE INVENTION

According to an aspect of the present invention, an image forming apparatus includes a density conversion unit converting the density of one or more image data from among plural image data to be combined having different tones so as to correspond to the tone to be combined; a combine unit combining the plural image data by using the image data whose density is converted by the density conversion unit; and an image forming unit forming an image by using the image data combined by the combine unit.

BRIEF DESCRIPTION OF THE DRAWINGS

Other objects, features, and advantages of the present invention will become more apparent from the following description when read in conjunction with the accompanying drawings, in which:

FIG. 5 illustrates an example functional configuration when a density data storage unit according to an embodiment is provided;

FIG. 6 illustrates an example functional configuration when a combine unit includes a maximum value output unit; and FIG. 7 illustrates an example functional configuration when a resolution conversion unit according to an embodiment is provided.

DETAILED DESCRIPTION OF THE PREFERRED EMBODIMENTS

In related art, when a woven pattern image of binary image data and an original picture image of multi-valued image data are combined, a total toner amount may be controlled to prevent the quality degradation of an output image.

However, such a technique means that, when a CMYK original picture is combined with woven pattern image in the same plane, nothing occurs except to control the total toner amount in pixels.

Namely, in the above method, a woven pattern image and an original picture image are combined in consideration of the total toner amounts only. Therefore, inappropriate combination results may occur, in which, for example, an image drawn in general colors may be collapsed and become invisible (obscured) due to the surrounding woven pattern image.

The present invention is made in light of at least the above problem, and may provide an image forming apparatus, an image forming method, and an integrated circuit capable of acquiring an appropriate image output data.

In the following, details of embodiments are described.

Figure 1:
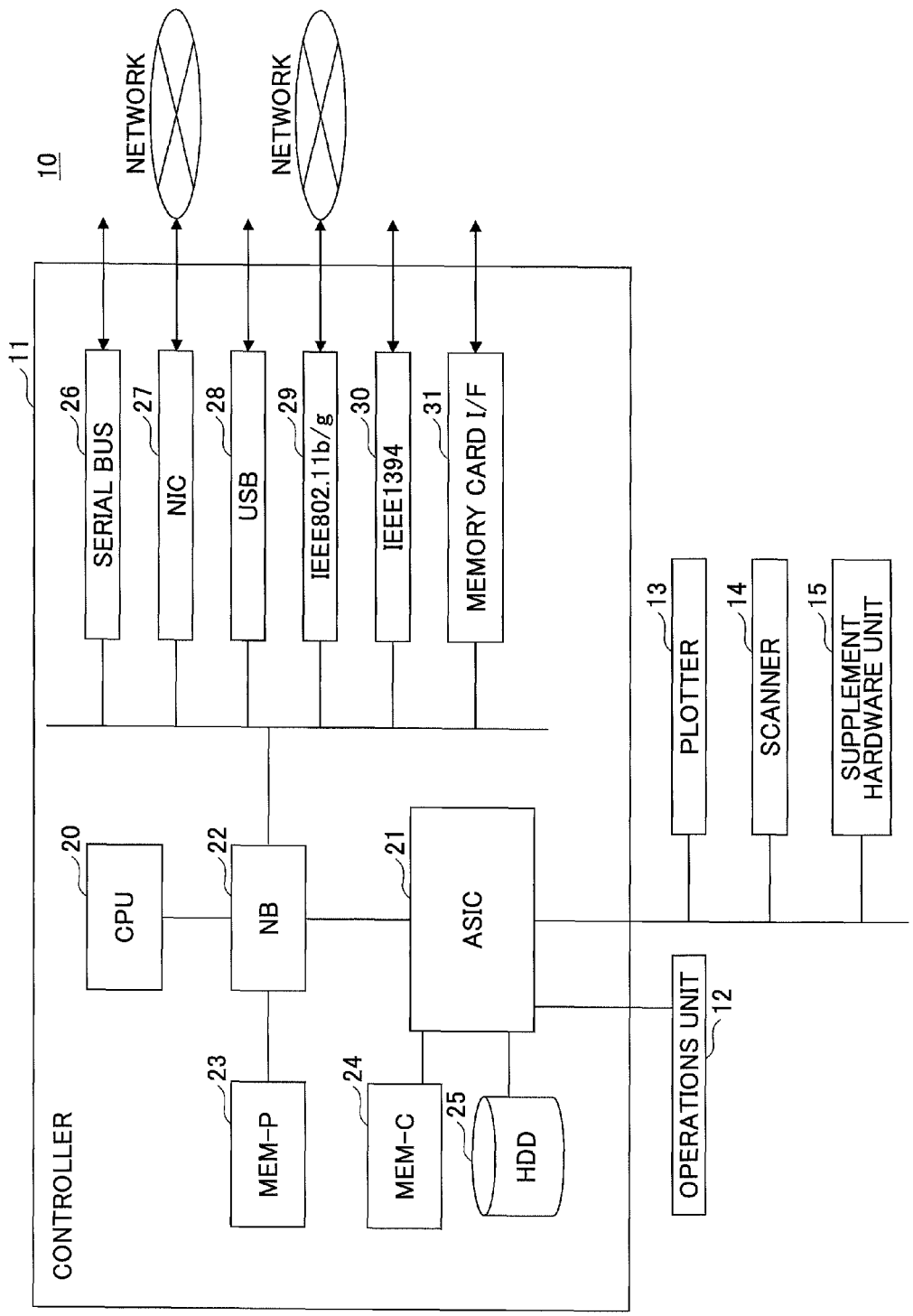
FIG. 1 illustrates an example hardware configuration of an image forming apparatus according to an embodiment.

FIG. 1 illustrates an example hardware configuration of an image forming apparatus according to an embodiment. As shown in FIG. 1, an image forming apparatus 10 includes a controller 11, an operations unit (operations panel) 12, a plotter 13, a scanner 14, and a supplemental hardware unit 15.

The controller 11 includes a Central Processing Unit (CPU) 20, an Application Specific Integrated Circuit (ASIC) 21, a North Bridge (NB) 22, a Memory-P (MEM-P) 23, a Memory-C (MEM-C) 24, a Hard Disk Drive (HDD) 25, a serial bus 26, a Network Interface Controller (NIC) 27, a Universal Serial Bus (USB) device 28, an IEEE802.11b/g device 29, an IEEE1394 device 30, and a memory card interface (I/F) 31.

The CPU 20 is an Integrated Circuit (IC) for various information processings and control in this embodiment. The ASIC 21 is an IC for various processings of image forming according to the embodiment. The NB 22 is a North Bridge of the controller 11.

The MEM-P 23 is a memory system of the image forming apparatus 10. The MEM-C 24 is a local memory of the image forming apparatus 10. The HDD 25 is an example storage (auxiliary storage) storing image data, document data, a program, font data, one or more print setting information items in data printing, access authority information and the like.

Further, the serial bus 26, the NIC 27, the USB device 28, the IEEE802.11b/g device 29, the IEEE1394 device 30, and the memory card interface (I/F) 31 are I/F devices in compliance with the respective standards, and enable data transmission and receiving with external devices via a network or the like.

The operations unit 12 receives user's input and displays screens for the user. The plotter 13 performs print output of image data and the like using an electrographic method or the like. The scanner 14 inputs image data and the like. The supplemental hardware unit 15 is a supplemental hardware resource which may be necessary for an image forming process and an image forming operation.

Schematic Configuration of Image Forming Apparatus

Figure 2:
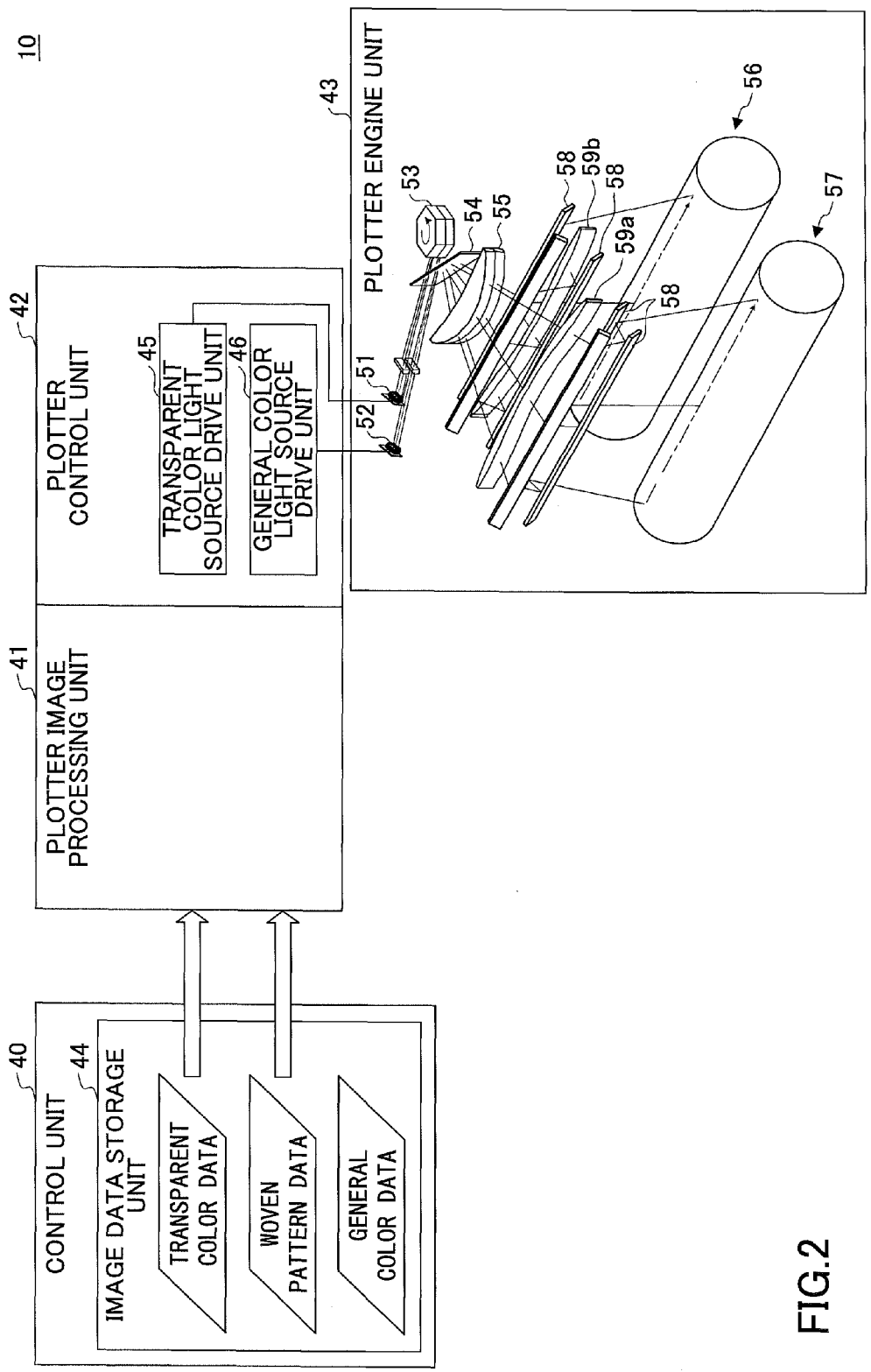
FIG. 2 illustrates a schematic configuration of the image forming apparatus according to the embodiment.

FIG. 2 illustrates a schematic configuration of the image forming apparatus according to the embodiment. As shown in FIG. 2, the image forming apparatus 10 includes a control unit 40, a plotter image processing unit 41, a plotter control unit 42, and a plotter engine unit (image forming unit) 43.

Further, for example, the control unit 40 corresponds to the controller 11 of FIG. 1; the plotter image processing unit 41 and the plotter control unit 42 correspond to the ASIC 21 of FIG. 1; and the plotter engine unit 43 corresponds to the plotter 13 of FIG. 1.

However, the present invention is not limited to this configuration. For example, in the description below, an ASIC that controls the plotter image processing unit 41 and the plotter control unit 42 only is provided outside of the controller 11 and is connected to the ASIC 21.

The control unit 40 includes an image data storage unit 44. The image data storage unit 44 stores, for example, transparent color data, woven pattern data, general color data and the like. For example, the transparent color data are video data or the like that become an original plotter image of the image forming apparatus 10. Further, the image data storage unit 44 corresponds to the HDD 25 in FIG. 5.

Here, the term "transparent color data" refer to data of a transparent color image formed of transparent color toner or the like. Further, the term "woven pattern data" refer to data of a woven pattern image including background color or the like.

Further, the term "general color data" refer to data of general color images formed by using toner usually used for image forming (image-forming toner), such toner including cyan (C), magenta (M), yellow (Y), and black (K) toners (i.e., data in respective CMYK color versions).

Further, as described in more detail below, the "woven pattern data" are combined with the "general color data". Namely, the "woven pattern data" are data of a woven pattern image formed by using the image-forming toner or dedicated toner which is mixed with the image-forming toner.

Upon receiving an image forming instruction from a user or the like, the control unit 40 acquires the transparent color data, the woven pattern data, and the general color data from the image data storage unit 44, and transfers the acquired data to the plotter image processing unit 41.

The plotter image processing unit 41 performs predetermined imaging processing on the transparent color data, the woven pattern data, and the general color data acquired from the control unit 40.

As the predetermined imaging processing, for example, the plotter image processing unit 41 performs γ conversion in accordance with the characteristics of the plotter engine unit 43, changes the frequency characteristics to emphasize edges and perform smoothing, and performs color correction and the like to convert a color space to obtain a predetermined color space.

Further, the predetermined image processings include a combining process that combines the woven pattern data and the general color data. Details of the woven pattern data are described below.

Further, the plotter image processing unit 41 outputs image output data on which a predetermined process is performed to the plotter control unit 42. Further, an example of a specific configuration of the plotter image processing unit 41 according to this embodiment is described below.

The plotter control unit 42 includes, for example, a transparent color light source drive unit 45, and a general color light source drive unit 46.

The transparent color light source drive unit 45 controls turning on and off a transparent color light source unit 51 in the plotter engine unit 43 in accordance with a light source control signal corresponding to transparent data included in the image output data acquired from the plotter image processing unit 41.

The general color light source drive unit 46 controls turning on and off a general color light source unit 52 in the plotter engine unit 43 in accordance with a light source control signal corresponding to general color data and combined data included in the image output data acquired from the plotter image processing unit 41.

The plotter engine unit 43 includes the transparent color light source unit 51, the general color light source unit 52, a polygon mirror 53 serving as a deflection scanning unit, a dustproof glass 54, an fθ lens 55, a general color imaging station 56, a transparent color imaging station 57, a mirror 58 serving as an image focusing optical device, a first scanning lens 59a, and a second scanning lens 59b.

The general color imaging station 56 forms general color images (based on, for example, CMYK colors), a combined image and the like. The transparent color imaging station 57 forms a transparent color image.

The plotter engine unit 43 forms images in the general color imaging station 56 and the transparent color imaging station 57 by using the image output data acquired from the plotter image processing unit 41 by driving the optical scanning device described above.

For example, a light flux emitted from the transparent color light source unit 51 and the general color light source unit 52 is incident to the polygon mirror 53. The polygon mirror 53 deflects the incident light flux. The deflected light flux passes through the dustproof glass 54 and the fθ lens 55 and is converted so as to move in accordance with a constant velocity scanning.

Further, the light flux in the constant velocity scanning is focused on surfaces to be scanned in the general color imaging station 56 and the transparent color imaging station 57 via the first scanning lens 59a and the second scanning lens 59b, so that the image of the image output data output from the plotter image processing unit 41 is formed.

Part of Optical System and Part of Image Forming Unit

Next, a part of an optical system and a part of an image forming unit in the image forming apparatus 10 are described with reference to drawings.

Figure 3:
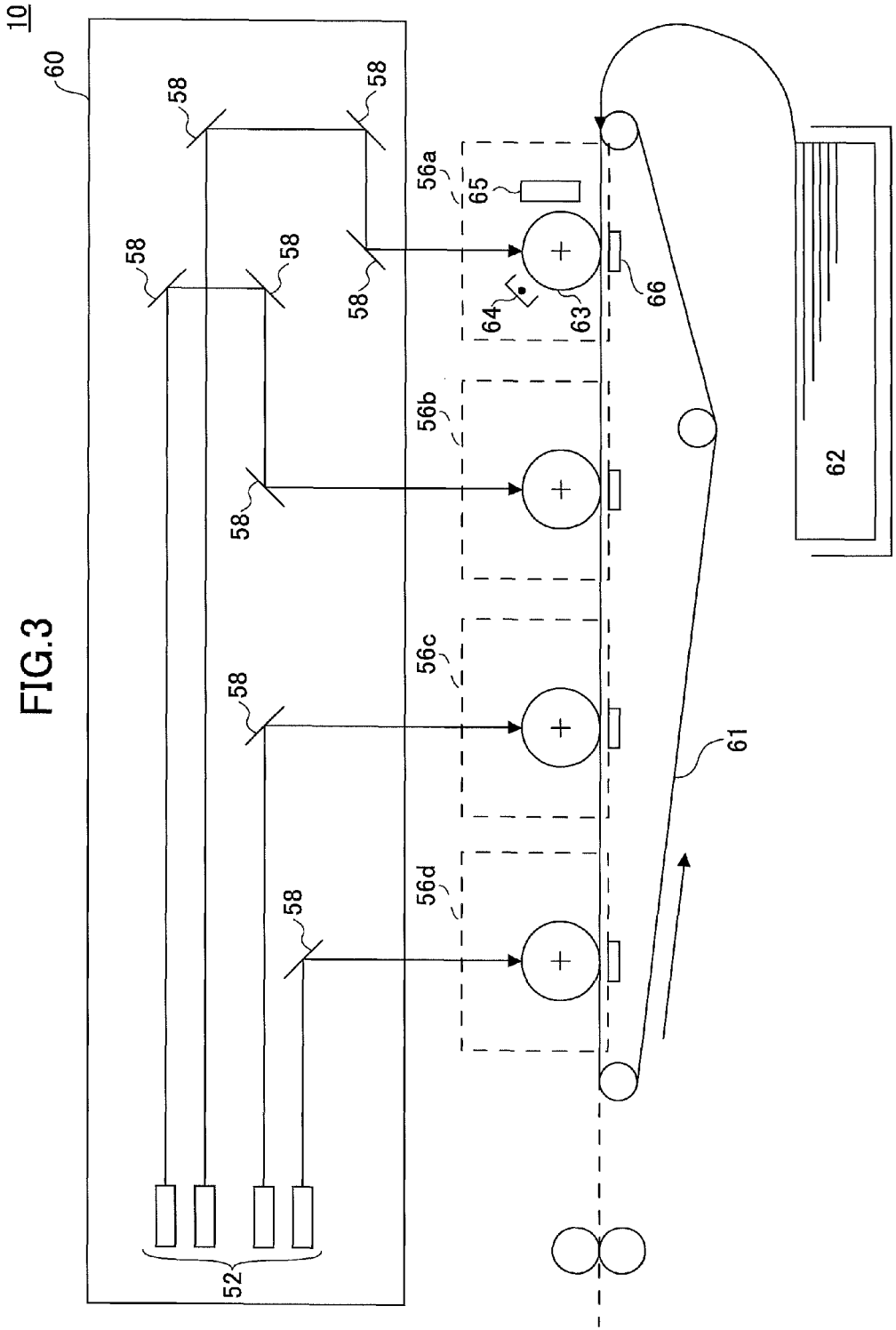
FIG. 3 illustrates a part of an optical system and a part of an image forming unit in the image forming apparatus of FIG. 2.

FIG. 3 illustrates a part of an optical system and a part of an image forming unit in the image forming apparatus of FIG. 2. More specifically, FIG. 3 illustrates an exposure unit 60 which includes, for example, the general color light source unit 52 and the mirror 58 as the optical system.

Further, as a part of the image forming unit, FIG. 3 illustrates general color imaging stations 56a through 56d for forming cyan (C), magenta (M), yellow (Y) and black (K) toner images of the general color images and the combined image.

More specifically, as shown in FIG. 3, the image forming apparatus 10 includes the general color imaging stations 56a through 56d, the exposure unit 60, a transfer belt 61, and a sheet feeding device 62.

Further, the general color imaging stations 56a through 56d include respective photosensitive bodies 63, chargers 64, developing devices 65, and transfer units 66.

As the photosensitive body 63, a photosensitive drum or the like is used. The photosensitive body 63 is rotatably driven and uniformly charged. Then, the light flux from the exposure unit 60 is repeatedly scanned in the main scanning direction and is moved in the sub scanning direction.

By doing this, a two-dimensional image is written (drawn), and the respective electrostatic latent image is formed on the photosensitive body 63.

Further, the electrostatic latent image formed on the photosensitive body 63 is developed by the developing device 65 to become a toner image of the general color image and the combined image. Then, the toner image is transferred onto a transfer sheet by the transfer units 66 and is fixed to the transfer sheet by a fixing device. The transfer sheet is fed from the sheet feeding device 62 by the transfer belt 61.

Plotter Image Processing Unit 41

Figure 4:
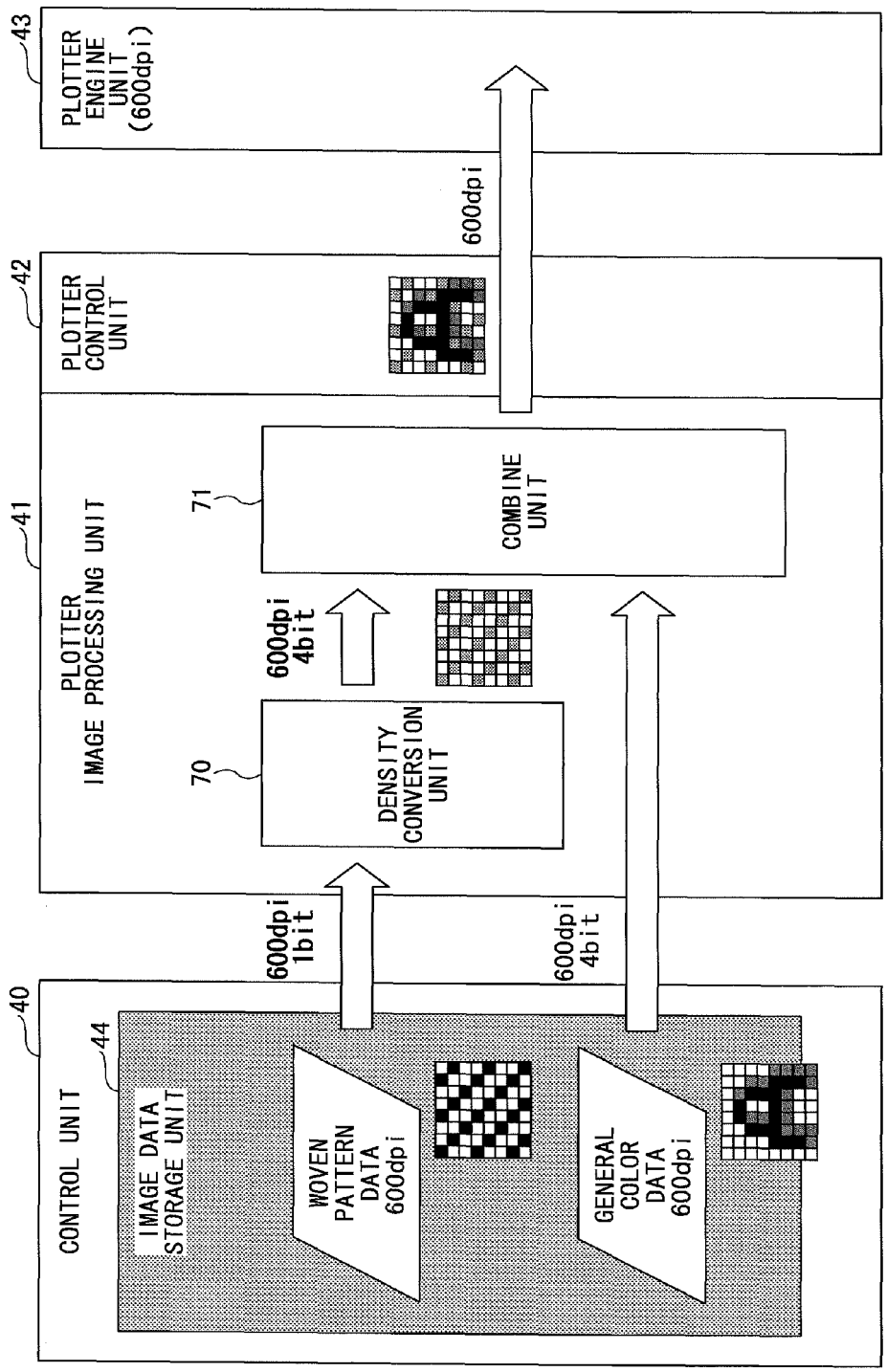
FIG. 4 illustrates an example functional configuration of a plotter image processing unit according to an embodiment.

Next, an example functional configuration of the plotter image processing unit 41 is described with reference to FIG. 4. FIG. 4 illustrates an example functional configuration of the plotter image processing unit 41 according to this embodiment. In the following, the combining process of combining the woven pattern data with the general color data is specifically described.

As shown in FIG. 4, the plotter image processing unit 41 includes a density conversion unit 70 and a combine unit 71.

In the example of FIG. 4, the woven pattern data (600 dpi) and the general color data (600 dpi) are stored in the image data storage unit 44 of the control unit 40. In the example, the woven pattern data are provided as one-bit binary image data (two tone levels: colored or non-colored). The general color data are provided as four-bit multi-valued image data (16 tone levels: density levels 0-15).

The density conversion unit 70 converts the density of one or more image data so that the converted density of the image data corresponds to the tone level of the image data to be combined when there are plural image data to be combined having tones different from each other.

For example, when acquiring a woven pattern data from the control unit 40, the density conversion unit 70 compares the bit information (tone information) of the woven pattern data with the bit information of the general color data.

Here, the density conversion unit 70 may acquire the bit information of the woven pattern data and the general color data from the control unit 40, or the bit information of the general color data alone may be stored in advance.

When determining that the bit information of the woven pattern data differs from that of the general color data, the density conversion unit 70 converts the density of either one or both of the image data, so that the converted density corresponds to the tone level of the image data to be combined.

Here, the term "corresponds to the tone level of the image data to be combined" refers to that, for example, when the tone levels of two image data to be combined with each other are different from each other, the lower tone level may be converted so as to be equal to the higher tone level.

Otherwise, the lower and higher tone levels may be converted so as to be equal to the same tone level which is determined in advance. Further, when there are three or more image data to be combined with each other, all the tone levels of the image data may be changed so as to be equal to the highest tone level among the image data.

In the example of FIG. 4, in order to convert the density so that the least value of the tone level of the image data is converted to the greatest value of the tone level, (in other words, the fewer number of the tone levels of the image data are converted into the greater number of the tone level of the image data), for example, the density conversion unit 70 converts one-bit woven pattern data into four-bit intermediate tone data.

In this case, for example, the density conversion unit 70 stores intermediate tone data in advance that it is set to be converted to an appropriate density, and converts the density based on the intermediate tone data.

For example, in a case where the density of the one-bit woven pattern data is "0", the density may be converted into "0" in four-bits of 16 levels of the density. Further, for example, in a case where the density of the one-bit woven pattern data is "1", the density may be converted into "8" in four-bits of 16 levels of the density.

Further, in a case where the density conversion unit 70 converts the density of the general color data or other image data, it is preferable that the density conversion unit 70 acquires the image data from the control unit 40 and converts the density.

The combine unit 71 combines plural image data to be combined by using the image data whose density is converted by the density conversion unit 70. In the example described above, the combine unit 71 combines the woven pattern data that have been converted into four-bit intermediate tone data with four-bit general color data.

In the example of FIG. 4 where the woven pattern data are combined with the general color data, the woven pattern data are converted into the intermediate tone data having appropriate density. Therefore, after the combining, an appropriate image output data may be obtained, while preventing the image to be drawn in general color from being collapsed and becoming invisible (obscured) due to difference in density between the woven pattern image and the general color image.

Further, it is not necessary for the control unit 40 to convert the density of the woven pattern data before sending the woven pattern data and the general color data to the plotter image processing unit 41. Therefore, the storage capacity in the control unit 40 may be reduced accordingly.

Also, it may become possible to improve the image data transmission efficiency between the control unit 40 and the plotter image processing unit 41.

Case Where Density Data Storage Unit is Provided

Next, a case where the plotter image processing unit 41 includes a density data storage unit is described with reference to the drawing.

FIG. 5 illustrates an example functional configuration when a density data storage unit according to this embodiment is provided. When compared with the case of FIG. 4, the configurations are same as each other except for the density data storage unit. Therefore, repeated descriptions of the elements having the same functions may be omitted.

As described in FIG. 5, the plotter image processing unit 41 includes the density conversion unit 70, the combine unit 71, and a density data storage unit 72.

The density data storage unit 72 stores the density data to be used in the density conversion unit 70. The density conversion unit 70 converts the density by using the density data stored in the density data storage unit 72 in accordance with the density which is set externally.

The density data storage unit 72 stores the density data using a conversion table in which, for example, the data "0" in one bit is to be converted into "A (e.g., "0")" from among 16 levels of four-bit density, and the data "1" in one bit is to be converted into "B (e.g., "1")" from among 16 levels of four-bit density.

Further, the density data storage unit 72 may store the values of such "A" and "B" as density conversion values depending on setting items, which includes, for example, a setting so that general color data is unlikely to become less invisible than woven pattern data (e.g., "A"="0", "B"="8"), a setting so that woven pattern data becomes more remarkable in white color (e.g., "A"="8", "B"="0") and the like.

As described above, by storing the density data in the density data storage unit 72, it may become possible for the density conversion unit 70 to convert the density of the image data into the density in accordance with the instructions externally received from a user and the like.

Further, in such a case, it is also possible to change the values "A" and "B" selected from 16 levels of density from the CPU 20 and the like.

By doing this, it may become possible to adjust the density after reviewing the image combined by the combine unit 71. Therefore, it may become possible to obtain more appropriate image output data.

Further, a combined image data after conversion may be displayed on the operations unit 12 or the like, so that a user may instruct to adjust the density of the respective image data.

Case Where Maximum Value Output Unit is Provided

Next, a case where the combine unit 71 includes a maximum value output unit is described with reference to the drawing.

FIG. 6 illustrates an example functional configuration when the combine unit includes the maximum value output unit. When compared with the case of FIG. 4, the configurations are same as each other except for the maximum value output unit. Therefore, repeated descriptions of the elements having the same functions may be omitted.

As shown in FIG. 6, the plotter image processing unit 41 includes the density conversion unit 70 and the combine unit 71. Further, the combine unit 71 includes a maximum value output unit 73.

The maximum value output unit 73 compares pixel density of the corresponding pixels of plural image data pixel by pixel by using the image data whose density is converted by the density conversion unit 70. Then, the maximum value output unit 73 outputs higher density values of the pixels of the imaged data.

In the example of FIG. 6, after acquiring the woven pattern data that have been converted into four bit intermediate tone data and four bit general color data, the maximum value output unit 73 compares the pixel density for each of the corresponding pixels.

For example, the woven pattern data that have been converted into four bit intermediate tone data. Therefore, the density in each of the pixels may have a value "0" or "8" from among 16 level values.

Here, as a result of the comparison between corresponding pixels, when determining that the pixel density of the general color data is higher than that of the woven pattern data, the maximum value output unit 73 outputs the value of the pixel density of the general color data.

On the other hand, when determining that the pixel density of the woven pattern data is higher than that of the general color data, the maximum value output unit 73 outputs the value of the pixel density of the woven pattern data.

By doing this, it may become possible for the combine unit 71 to output a higher value of the pixel density for each of the corresponding pixels rather than simply output one of the selected pixel density values of either the woven pattern data or the general color data as a selected unit base. Therefore, it may become possible to obtain more appropriate image output data.

Case Where Resolution Conversion Unit is Provided

Next, a case where the plotter image processing unit 41 includes a resolution conversion unit is described with reference to the drawing.

FIG. 7 illustrates an example functional configuration when the resolution conversion unit according to this embodiment is provided. When compared with the case of FIG. 4, the configurations are same as each other except for the resolution conversion unit. Therefore, repeated descriptions of the elements having the same functions may be omitted.

As shown in FIG. 7, the plotter image processing unit 41 includes the density conversion unit 70, the combine unit 71, and a resolution conversion unit 74.

In the example of FIG. 7, the image data storage unit 44 of the control unit 40 stores the woven pattern data (600 dpi) and the general color data (600 dpi).

The resolution conversion unit 74 converts the resolution of one or more image data from among plural image data to be combined and having resolutions different from each other, so that the converted resolution may correspond to the resolution of the image data to be combined.

For example, after acquiring the woven pattern data from the control unit 40, the resolution conversion unit 74 compares resolution information of the woven pattern data with resolution information of the general color data.

In this case, the resolution conversion unit 74 may acquire the resolution information of the woven pattern data and the general color data as well from the control unit 40. Further, the resolution conversion unit 74 may acquire only the resolution information of the woven pattern data and store the resolution information of the general color data in advance.

After comparing the resolution information of the woven pattern data with the resolution information of the general color data, when determining that the resolution of the woven pattern data does not correspond to that of the general color data, the resolution conversion unit 74 converts either or both of the resolution of the image data so that the converted resolution corresponds to that of the image data to be combined.

In the example of FIG. 7, the resolution conversion unit 74 compares the resolution "300 dpi" of the woven pattern data with the resolution "600 dpi" of the general color data, and performs, for example, a magnification process on the woven pattern data so that the resolution of the woven pattern data corresponds to that of the general color data.

To that end, for example, the resolution conversion unit 74 may double the resolution "300 dpi" ("300 dpi"×2) of the woven pattern data in the sub scanning direction. In this case, a smoothing circuit may be provided for smoothing.

When the resolution conversion unit 74 converts the resolution of the general color data, it is preferable that the resolution conversion unit 74 acquires the general color data from the control unit 40 and converts the resolution.

The density conversion unit 70 converts the density of the image data whose resolution is converted by the resolution conversion unit 74, so that the converted resolution corresponds to that of the tone of the imaged data to be combined.

In the example of FIG. 7, the density conversion unit 70 converts the density of the woven pattern data whose resolution is converted by the resolution conversion unit 74, so that the converted resolution corresponds to that of the tone of the general color data.

As described above, in the example of FIG. 7, by providing the resolution conversion unit 74, a difference in the resolution between the image data to be combined with each other may be eliminated and the resolution may be adjusted to correspond to the image data to be combined, and then, the density of the image data is converted. By doing this, it may become possible to obtain more appropriate image output data.

Further, as described above, in the plotter image processing unit 41 which may be provided as an ASIC, each of the units included in the plotter image processing unit 41 may be provided as an integrated circuit.

As described above, according to an embodiment, for example, in combining plural image data having different tones from each other, it may become possible to obtain more appropriate image output data.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
   a density conversion unit configured to convert the density of one or more image data from among plural image data to be combined having different tone levels so as to correspond to a single tone to be combined;
   a combine unit configured to combine the plural image data by using the image data whose density is converted by the density conversion unit;
   and
   an image forming unit configured to form an image by using the image data combined by the combine unit.

2. The image forming apparatus according to claim 1, wherein, when the one or more image data are binary image data, the density conversion unit is configured to convert the binary image data so as to correspond to multi-valued image data to be combined.

3. The image forming apparatus according to claim 1, further comprising
   a density data storage unit configured to store density data to be used by the density conversion unit,
   wherein the density conversion unit is configured to convert the density by using the density data stored in the density data storage unit.

4. The image forming apparatus according to claim 1, wherein the combine unit includes
   a maximum value output unit configured to compare image density for each of corresponding pixels between the plural image data by using the image data whose density is converted and output a higher value of the image density of one of the plural image data.

5. The image forming apparatus according to claim 1, further comprising
   a resolution conversion unit configured to, when the resolution of the plural image data is different, convert the resolution of the one or more image data so as to correspond to the resolution to be combined,
   wherein the density conversion unit is configured to convert the density of the image data whose resolution is converted by the resolution conversion unit so as to correspond to the tone to be combined.

6. The image forming apparatus according to claim 1, wherein the plural image data includes background image data and color image data.

7. The image forming apparatus according to claim 1, wherein the plural image data includes woven pattern data and color image data.

8. An image forming method for an image forming apparatus, comprising:
   a density conversion step of converting the density of one or more image data from among plural image data to be combined having different tone levels so as to correspond to a single tone to be combined;
   a combine step of combining the plural image data by using the image data whose density is converted in the density conversion step;
   and
   an image forming step of forming an image by using the image data combined in the combine step.

9. An integrated circuit for an image forming apparatus, comprising:
   a density conversion unit configured to convert the density of one or more image data from among plural image data to be combined having different tone levels so as to correspond to a single tone to be combined; and
   a combine unit configured to combine the plural image data by using the image data whose density is converted by the density conversion unit.

* * * * *